(12) United States Patent
Wang et al.

(10) Patent No.: US 8,712,991 B2
(45) Date of Patent: Apr. 29, 2014

(54) DOCUMENT-RELATED REPRESENTATIVE INFORMATION

(75) Inventors: Jingdong Wang, Beijing (CN); Shipeng Li, Beijing (CN)

(73) Assignee: Microsoft Corporation, Redmond, WA (US)

(*) Notice: Subject to any disclaimer, the term of this patent is extended or adjusted under 35 U.S.C. 154(b) by 90 days.

(21) Appl. No.: 13/178,034

(22) Filed: Jul. 7, 2011

(65) Prior Publication Data

US 2013/0013596 A1    Jan. 10, 2013

(51) Int. Cl.
   *G06F 17/30* (2006.01)

(52) U.S. Cl.
   USPC ........... 707/708; 707/749; 707/750; 707/751; 707/728

(58) Field of Classification Search
   USPC ......................................... 707/728, 706, 736
   See application file for complete search history.

(56) References Cited

U.S. PATENT DOCUMENTS

| | | | |
|---|---|---|---|
| 7,158,966 B2 * | 1/2007 | Brill et al. ............................. | 1/1 |
| 7,349,896 B2 * | 3/2008 | Chowdhury et al. ................. | 1/1 |
| 7,379,949 B2 * | 5/2008 | Chowdhury .......................... | 1/1 |
| 7,840,538 B2 * | 11/2010 | Joshi et al. .................... | 707/672 |
| 8,024,308 B2 * | 9/2011 | Jones et al. ................... | 707/705 |
| 8,135,721 B2 * | 3/2012 | Joshi et al. .................... | 707/750 |
| 8,145,630 B1 * | 3/2012 | Garg et al. .................... | 707/722 |
| 8,244,585 B1 * | 8/2012 | Huang et al. ................. | 705/14.41 |
| 8,321,448 B2 * | 11/2012 | Zeng et al. .................... | 707/767 |
| 2006/0288000 A1 | 12/2006 | Gupta | |
| 2007/0043706 A1 * | 2/2007 | Burke et al. ...................... | 707/3 |
| 2008/0033970 A1 * | 2/2008 | Jones et al. .................... | 707/100 |
| 2008/0154877 A1 * | 6/2008 | Joshi et al. ........................ | 707/5 |
| 2008/0168032 A1 | 7/2008 | Criou et al. | |
| 2008/0208841 A1 * | 8/2008 | Zeng et al. ........................ | 707/5 |
| 2009/0077037 A1 * | 3/2009 | Wu et al. ........................... | 707/3 |
| 2009/0240683 A1 | 9/2009 | Lazier et al. | |
| 2009/0271374 A1 | 10/2009 | Korn et al. | |
| 2010/0228710 A1 | 9/2010 | Imig et al. | |
| 2011/0055189 A1 * | 3/2011 | Effrat et al. .................... | 707/706 |

OTHER PUBLICATIONS

Beeferman et al., "Agglomerative clustering of a search engine query log", 6th International Conference on Knowledge Discovery and Data Mining (KDD-2000), Boston, Massachusetts, Aug. 20-23, 2000, pp. 407-416.

(Continued)

*Primary Examiner* — Debbie Le
(74) *Attorney, Agent, or Firm* — Carole Boelitz; Micky Minhas; Lee & Hayes, pllc.

(57) ABSTRACT

Some implementations include techniques and arrangements to provide document-related representative information with search results. For example, a representative query and/or representative results may be provided for one or more individual documents identified in a set of search results to supplement the search results returned in response to a received search query. The representative queries may be determined by correlating a plurality of previously submitted queries in search log data with a plurality of documents returned in response to the queries. In some implementations, click-through frequency for a particular document with respect to the plurality of queries may be taken into consideration when determining the representative queries for the particular document. In some implementations, the representative queries serve to categorize the search results based on subject matter, and a link may be provided to representative results corresponding to the representative query for accessing documents directed to similar subject matter.

20 Claims, 9 Drawing Sheets

(56) References Cited

OTHER PUBLICATIONS

Dupret et al., "Recommending Better Queries Based on Click-Through Data", 12th International Conference on String Processing and Information Retrieval (SPIRE '05), 2005, Buenos Aires, Argentina, Nov. 2-4, 2005, 12 pages.

Mei et al., "Query Suggestion Using Hitting Time", 17th Conference on Information and Knowledge Management (CIKM '08), Napa Valley, California, Oct. 26-30, 2008, 9 pages.

* cited by examiner

DOCUMENT-RELATED REPRESENTATIVE INFORMATION

BACKGROUND

Various tools are available to assist users in locating desired information during a search, such as during a search for information on the World Wide Web. For instance, a typical search service may provide tools that include query suggestion, result previews, related searches and search result filtering. Query suggestion presents suggested queries that are determined from search histories, and a part of a suggested query may correspond to a portion of a current typed query. This can assist a user with query formulation while the user is typing a query. Further, result previews may be provided that include a snippet, a visual preview, or a summary such as "more on this page." This can provide a user with a quick view of the search results. Additionally, a "related search" list may list several alternative queries related to a current query. This can help the user to determine alternative queries for finding desired search results. Furthermore, search result filtering can help the user narrow down a search range by specifying other constraints, including time, location and so forth.

Yet another tool may provide one or more suggested queries with each individual search result displayed on a search results page. For example, suggested queries may appear alongside an associated individual search result (e.g., a displayed uniform resource locator (URL)) and/or in an expandable panel proximate to the individual search result. In some instances, these related queries may be determined by using a search result URL to find a query, by analyzing a search result's text snippet, by accessing historical data, and/or by accessing current user session data.

SUMMARY

This Summary is provided to introduce a selection of concepts in a simplified form that are further described below in the Detailed Description. This Summary is not intended to identify key or essential features of the claimed subject matter; nor is it to be used for determining or limiting the scope of the claimed subject matter.

Some implementations disclosed herein provide techniques and arrangements to present document-sensitive representative information, such as representative queries and/or corresponding results to assist users during a search. The representative queries and representative results may be provided based at least in part on information obtained by mining historical search logs.

BRIEF DESCRIPTION OF THE DRAWINGS

The detailed description is set forth with reference to the accompanying drawing figures. In the figures, the left-most digit(s) of a reference number identifies the figure in which the reference number first appears. The use of the same reference numbers in different figures indicates similar or identical items or features.

DETAILED DESCRIPTION

Representative Queries and Results

The technologies described herein generally relate to providing search results in a manner that assists a user in more quickly locating desired information. For instance, the search results may be presented with supplemental information that helps a user to focus a search. Some implementations provide one or more representative queries corresponding to one or more search results in a set of search results. For example, a representative query may be provided for each individual uniform resource locator (URL) or document listed as a search result on a search results page. In some instances, a representative query may represent the most-common or most-likely query used for obtaining the particular search result that the particular representative query is associated with. As one example, representative queries may be obtained by mining document ranking and click-through information from historic search logs. The representative query associated with each search result may provide focus for refining a current query to assist a user in better formulating the user's search intention. Further, each representative query may be associated with supplemental representative search results or a link that can lead a user directly to the supplemental representative search results obtained based on the representative query. For example, each representative query may be associated with a specific URL link that will display the associated representative search results.

In order to help users obtain desired results more rapidly, some implementations herein provide additional options for search results, as compared with conventional search results pages. For example, in some implementations, the search results for a received query input may be categorized into several more detailed aspects. Each aspect may include a representative query that provides a common feature (e.g., common subject matter) relating to all the documents within the category. Thus, some implementations may provide a supplemented search result presentation or arrangement by categorizing the search results based at least in part on the representative queries. Accordingly, representative results based on each representative query may also be provided in the presented search results. For example, one or more top-ranked representative results for each representative query may be displayed with the results, or may be accessible through an expandable link provided adjacent to each representative query.

By accessing the results of a particular classification or category, users are able to more quickly focus their search on a particular subject by clicking the specific representative query or by expanding the top representative results provided based on the representative query. In some implementations, the representative queries may be determined based on several considerations, such as: (1) the representative queries are relevant to the documents in the category or group, i.e., the documents are frequently clicked when users issued such queries, and are generally highly ranked in results for such queries; (2) the representative queries are "hot" queries in a recent time period, i.e., have been popularly submitted by a large number of users in a recent time period; and (3) the representative queries are both representative and diverse in a single search result, i.e., there is some diversity among the representative queries to provide for some diversity in results.

Additionally, the document-related representative queries can also serve as a summary of the corresponding document or URL. For instance, this summary may be achieved by exploiting historic search logs and determining relationships between queries and corresponding documents returned in response to the queries. Further, the presentation of the representative query and corresponding representative results for each search result may assist or teach users to formulate their queries more effectively in the future. When users are able to find their desired information by clicking on the representative queries, the users will learn to submit queries formulated as the representative queries and thereby experience a more efficient search experience in the future.

Accordingly, implementations herein may display one or more representative queries for each document listed in a search results page, such as immediately below each search result, and may also display one or more corresponding representative results or an expandable link that may be clicked on for displaying the one or more representative results. For example, at least one representative query and corresponding representative results, or a link thereto, may be positioned next to each listed URL in the search results page.

Query Representation Framework

Figure 1:
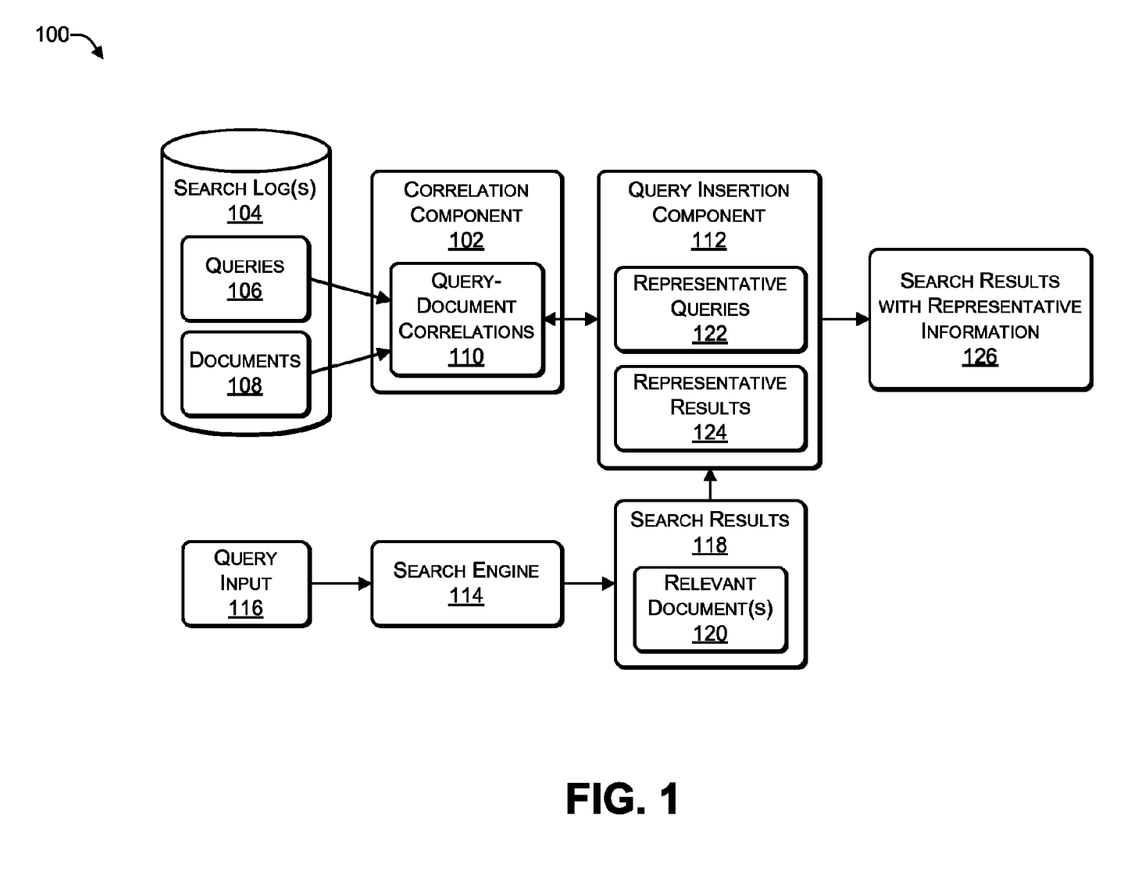
FIG. 1 illustrates an example framework for presenting document-related representative information according to some implementations.

FIG. 1 illustrates an example of a framework 100 for document-related query representation according to some implementations. The functions of the framework 100 may be executed by one or more computing devices or other particular machines specifically configured with processor-executable instructions, as discussed additionally below. In this example, a correlation component 102 accesses one or more search logs 104 containing historical search information including previously submitted queries 106 and corresponding documents 108. For example, the documents 108 may each be a URL representative of a particular webpage or other search result obtained by submission of one or more of the previously submitted queries 106. The correlation component 102 may identify query-document correlations 110 between the queries 106 and the documents 108. For example, the correlation component 102 may determine from the search log 104 which of the queries 106 returned which of the documents 108 as being highly ranked. In some implementations, the correlation component 102 may also take into consideration the frequency with which a particular query 106 is submitted by a large number of users. Further, the correlation component 102 may determine which of the queries 106 resulted in users accessing or clicking through to particular ones of the documents 108. As described in additional detail below, particular documents 108 and queries 106 may be correlated based on the actions of a large number of users for identifying documents 108 and queries 106 that are related to one another.

The correlation component 102 may provide the query document correlations 110 to a query insertion component 112 that may use the query document correlations 110 for determining representative queries for insertion into search results. For example, a search engine 114 may receive a query input 116, such as from a user submitting a search query to locate desired information. In response to receiving the query input 116, the search engine 114 may identify search results 118 including one or more relevant URLs or relevant documents 120 that the search engine 114 has determined are relevant to the query input 116. For example, a typical search engine determines the most relevant search results for a query input by using various page-ranking algorithms and numerous other considerations for ranking the search results. Thus, implementations herein are not limited to any particular technology for determining or ranking the relevant documents 120 in the search results 118.

The query insertion component 112 may determine from the search results 118 and the query document correlations 110 one or more representative queries 122 and/or one or more representative results 124. For example, based at least in part on the query document correlations 110 and the relevant documents 120 identified in the search results 118, the query insertion component 112 can determine at least one representative query 122 corresponding to each of the relevant documents 120. For instance, the query-document correlations 110 may include an index based on the URLs of the documents 108 that enables the query insertion component 112 to quickly locate one or more representative queries for a particular relevant document 120 identified by the search engine 114. Thus, as one example, the query insertion component may match the URL of a relevant document 120 with a URL in the query document correlations for determining one or more representative queries for a particular relevant document 120. Further, the query insertion component 112 can also determine representative results 124 that correspond to the one or more representative queries 122. For example, the query insertion component can submit a selected representative query to the search engine 114 to obtain the top several representative results 124 for the particular representative query.

The query insertion component 112 may insert the representative queries 122 and or/representative results 124 into the search results 118 for generating search results 126 with representative information including at least one of the representative queries 122 and/or the representative results 124. For example, as described below with reference to FIG. 2, the query insertion component 112 may generate a search results page that is configured to display supplemental information including at least one of representative query or a link to corresponding representative results adjacent to each of the search results displayed on the search results page.

Example Search Results Presentation

Figure 2:
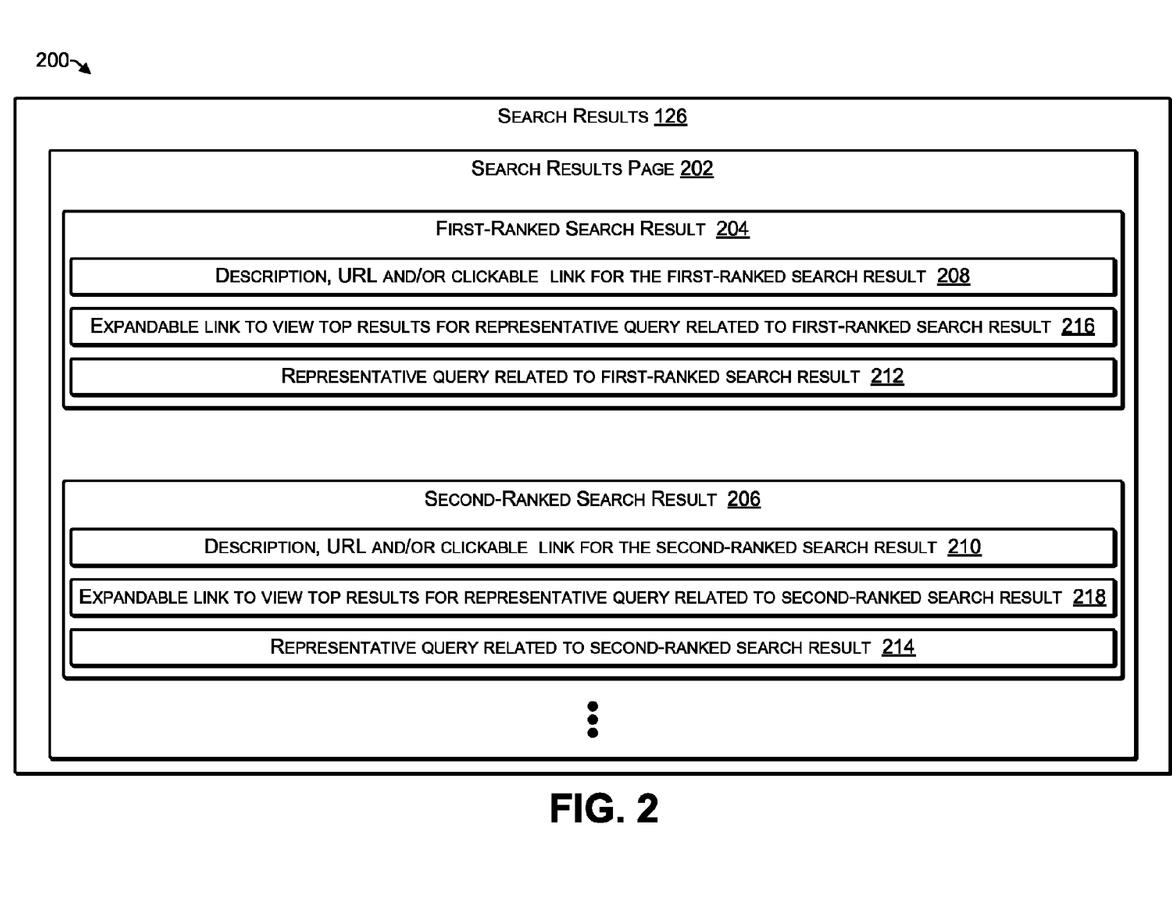
FIG. 2 illustrates an example search result presentation arrangement including representative queries and expandable representative results according to some implementations.

FIG. 2 illustrates an example layout 200 of search results 126 with representative information. The search results 126 may be laid out in a search results page 202 listing a highest or first-ranked search result 204, a second-ranked search result 206 and so forth. As one non-limiting example, the search results page 202 may be generated as a hypertext markup language (HTML) page that is delivered to a user that submitted the query input 116. Thus, the first-ranked search result 204 may include at least one of a description, a URL and/or a clickable link 208 for the first-ranked search result. Similarly, the second-ranked search result 206 may include at least one of a description, a URL and/or a clickable link 210 for the second-ranked search result.

Each search result 204, 206, ..., may be presented with an associated representative query. For example, the first-ranked search result 204 may be presented with a representative query 212 related to the first-ranked search result, and the second-ranked search result 206 may be presented with a representative query 214 related to the second-ranked search result. For example, if a user wishes to submit one of the representative queries 212 or 214 to the search engine to obtain corresponding results, the user may click on one of the representative queries 212 or 214. In addition, in some implementations, an expandable link 216 to view the top results for the representative query related to the first-ranked search results may also be presented with the first-ranked search result 204. Similarly, an expandable link 218 to view the top results for the representative query related to the second-ranked search result may be presented with the second-ranked search result 206. Alternatively, in some implementations, rather than presenting an expandable link 216, 218, one or several of the representative search results relating to the representative query may be presented with the search results 204, 206 and the representative queries 212, 214. Thus, by receiving several of the representative results or by clicking on the expandable link 216 or 218 to view several of the representative results, a user may have a preview of the results that might be obtained by clicking on the corresponding representative query without having to navigate away from the current search results page 202.

Figure 3:
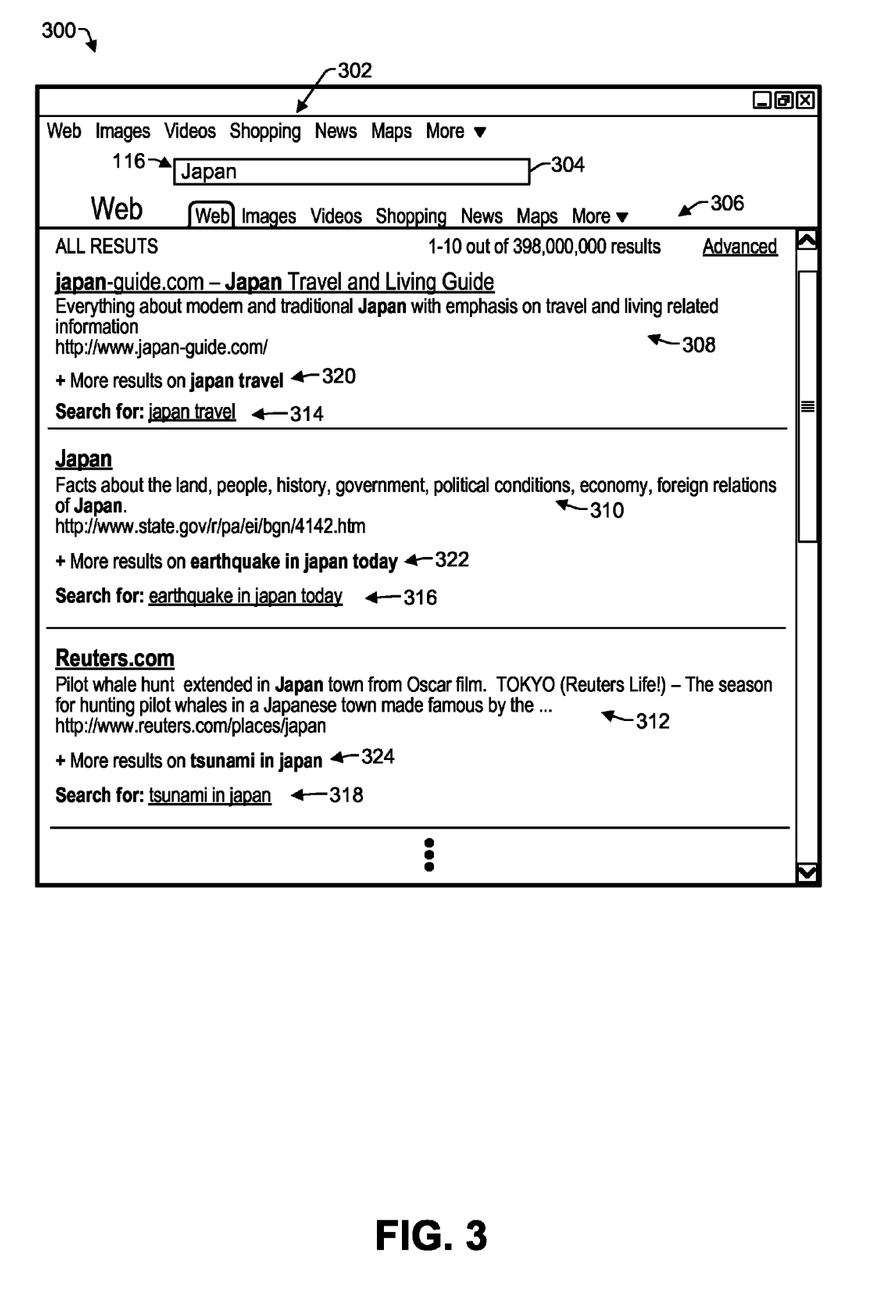
FIG. 3 illustrates an example search results page including representative queries and expandable results according to some implementations.

FIG. 3 illustrates an example search results page 300 to depict further aspects of the layout 200 described above. For example, the example search results page 300 may be generated with typical search engine search options 302 such to provide focused searches of the Web, images, videos, shopping, news, maps, and more categories. The search results page 300 may also include a query entry or submission box 304 for displaying a current query input 116. The search results page 300 may also include a listing 306 of search results, which may list a highest-ranked search result 308 first on the page 300, followed by a second-ranked search result 310, a third-ranked search result 312, and so forth.

In this example, suppose that a user has entered "Japan" as the query input 116 submitted to the search engine 114. The search engine 114 may locate a plurality of search results and provide the search results to the query insertion component 112, which may generate the search results page 300. The query insertion component 112 may construct the search results page 300 so that each search result 308, 310, 312, ... is presented with an associated representative query. In this example, a first representative query 314 "japan travel" is presented proximate to the first-ranked search result 308. For example, using techniques described additionally below, the query insertion component 112 may determine that the first representative query 314 "japan travel" is representative of the first-ranked search result 308, "japan-guide.com" which relates to travel and living related information on Japan. Accordingly, the query insertion component 112 may insert the representative query 314 in a position proximate to the first-ranked search result 308 and prior to the second-ranked search result 310. Similarly, the query insertion component 112 may provide a second representative query 316 proximate to the second-ranked search result 310. In this example, the second representative query 316, "earthquake in japan today," has been determined to be representative of the second-ranked search result 310, which relates to a Japanese government website. Additionally, the query insertion component 112 may provide a third representative query 318 proximate to the third ranked search result 312. In this example, the query insertion component 112 has identified the third representative query 318, "tsunami in japan," as being relevant to a Japanese town located on the coast of Japan.

The listing 306 of search results may also include representative results corresponding to the representative queries. In the illustrated example, a first expandable link 320 is provided for displaying representative results corresponding to the representative query "japan travel." For example, the first expandable link 320 may be located in the search results page 300 adjacent to the corresponding first representative query 314. Similarly, a second expandable link 322 corresponding to the representative query "earthquake in japan today" is provided adjacent to the second representative query 316, and a third expandable results link 324 corresponding to the third representative query 318 "tsunami in japan" is provided adjacent to the third representative query 318.

Figure 4:
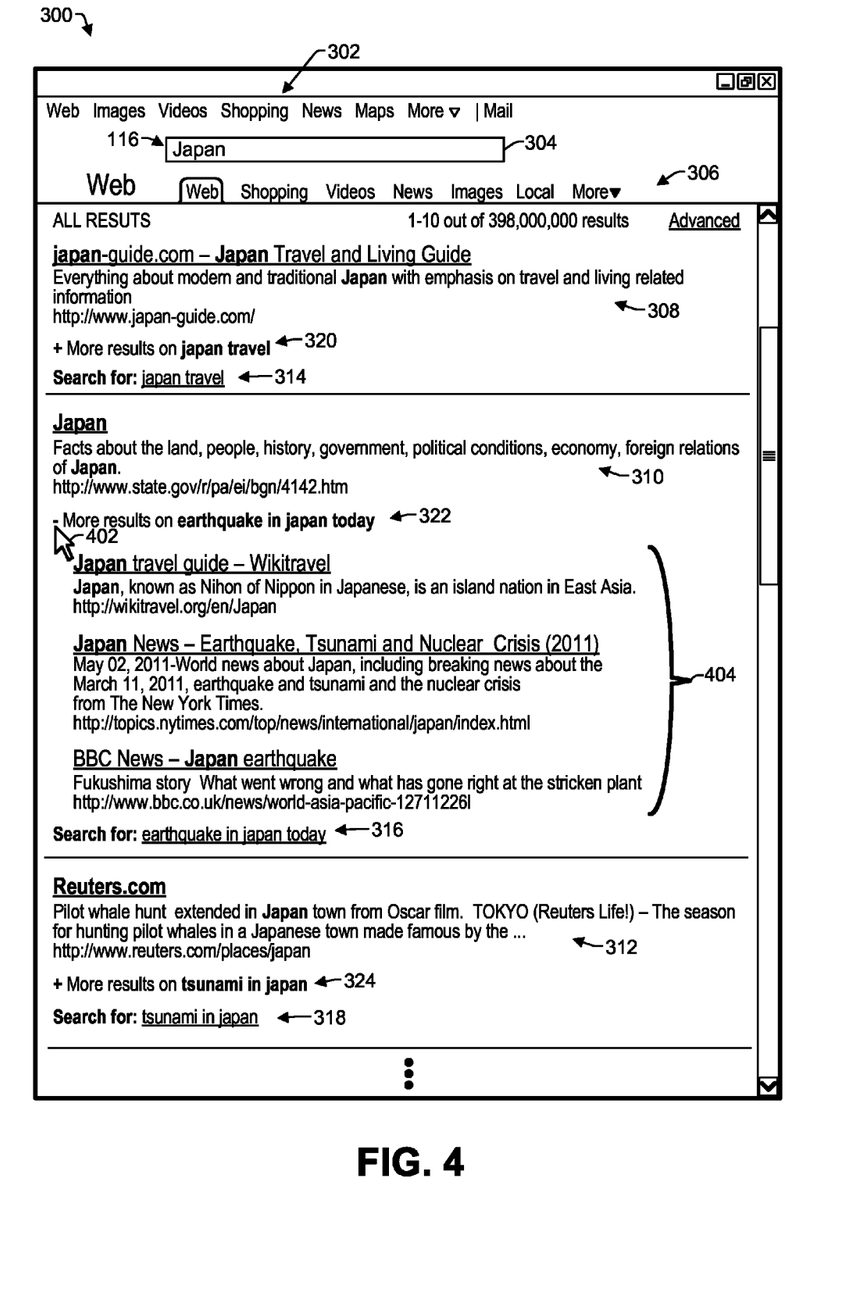
FIG. 4 illustrates the example search results page of FIG. 3 with one set of representative results in an expanded state.

FIG. 4 illustrates the example search results page 300 of FIG. 3 with the second expandable link 322 expanded to provide the representative results corresponding to the representative query 316. For example, a user may expand the second expandable results link 322, such as by clicking on the link 322 using a mouse cursor 402, or the like, as shown in FIG. 4. This results in display of one or more representative results 404 related to the second representative query 316. For example, when generating the results page 300, the query insertion component 112 may submit the representative query 316 to the search engine 114 to obtain the top one or several results for the representative query 316, and provide these as the representative results 404 corresponding to the representative query 316. Thus, in the illustrated example of FIG. 4, the representative results 404 have all been determined by the query insertion component 112 to be related to the representative query 316 and are thereby also related to the second-ranked search result 310. Accordingly, the representative query 316 represents a grouping or categorization of a plurality of search results that are all related to one another based on an analysis and identification of previously submitted queries that result in the selection of those search results.

Furthermore, while the example search results page 300 of FIG. 3 provides expandable links 320, 322, 324 to display the representative results, in other implementations, rather than providing a link, the top one, two, three, etc., representative results may be provided directly in the search results page 300 such as is illustrated for representative results 404 in FIG. 4, so that the user does not have to expand the expandable links 320, 322, 324 to view the representative results. For example, in some implementations, the user may set as a preference whether to receive the representative results in an expandable link or in an already-expanded format proximate to each search result. In addition, while a single representative query is shown in the implementations of FIGS. 2-4, in other implementations, multiple representative queries may be displayed with one or more of the search results 308, 310, 312. In this case, multiple links to corresponding representative results may also be provided with each representative query. Further, other variations will also be apparent to those of skill in the art in view of the disclosure herein.

Example of Document-Query Correlation

Figure 5:
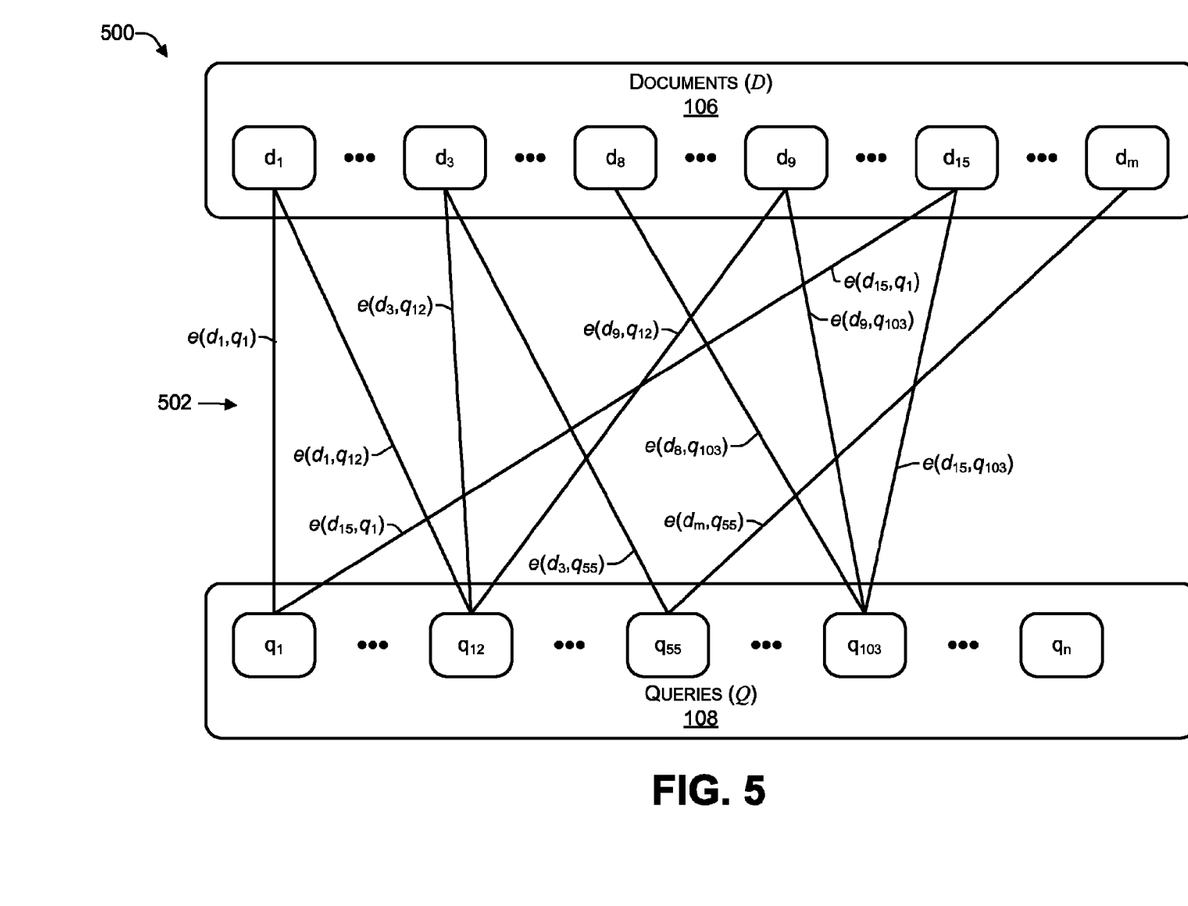
FIG. 5 illustrates an example bipartite graph for determining representative queries according to some implementations.

FIG. 5 illustrates an example of a bipartite graph 500 that may be constructed by the correlation component 102 according to some implementations. Bipartite graph 500 is only one example of a suitable data structure that may be used to assist in determining query-document correlations 110 between the previously submitted queries 108 and the plurality of documents 106 related to the queries 108. In some implementations, the documents 106 and the queries 108 may be obtained from historical search log data. Further, in some implementations, the search log data may be very recent search log data such as data added to the search logs over a recent period of time, such as an immediately previous week, an immediately previous day, an immediately previous hour, or the like. As mentioned above, in the context of a search conducted on the World Wide Web, a "document," as used herein, typically may be a webpage that corresponds to a particular URL or multiple URLs. However, in the context of other types of searches, a "document" may be a different type of document, data object, or the like.

Bipartite graph 500 includes a set of the plurality of documents 106, which may be denoted by $\mathcal{D} = \{d_i\}_{i=1}^m$. Further a set of the plurality of queries 108 may be denoted by $Q = \{q_j\}_{j=1}^n$. Some implementations herein construct the bipartite graph 500 to correlate pairs of documents and queries $(d_i, q_j)$, such that a document-query pair represents an association relation between the document $d_i$ and the query $q_j$. In other words, the document $d_i$ is deemed to be related to the query $q_j$ when the document $d_i$ appears in the search results of $q_j$. When a document $d_i$ is related to the query $q_j$ an edge 502 is created between the document and the related query. Each edge 512 may be expressed as $e(d_i, q_j)$ and may also be assigned a weight $a(d_i, q_j)$, which indicates the dynamic rank value of the document $d_i$ appearing in the result of the query $q_j$. Accordingly, if a document is ranked first in the results for a particular query, the edge from the query to that document will have a higher weight than an edge from the same query to a document that is ranked tenth in the results for the query. In addition, each query $q_j$ may be associated with a value $f_{q_j}$ reflecting a frequency with which the query is issued by the users of the search engine. A frequency vector may be generated and denoted as f, whose dimension is n. Further, the corresponding dynamic rank vector is denoted as a for a specific document.

Some implementations herein determine the relevance r of a particular query $q_j$ to a particular document $d_i$ as $r = \lambda a + (1-\lambda)f$, in which $\lambda$ may equal, for example, 0.5, and which may also be expressed as $r = \min(a, f)$. The query with the largest relevance may then be selected as the representative query for a particular document. Further in some implementations, multiple queries may be selected as representative queries, i.e., the top k most-relevant queries may be selected as representative queries for a particular document. However, this may lead to a problem that multiple queries with very similar meanings are selected. Therefore, implementations herein maintain diversity among representative queries by taking into account the relations among the queries, which may be represented by an affinity matrix $S = [S_{ij}]_{n \times n}$. Accordingly, an objective function for correlating queries to documents may be expressed as follows:

$$F(C) = \sum_{c \in C} r_c + \alpha \sum_i f(r_i) \max_{c \in C} \mathrm{sim}(q_i, c) - \beta \sum_{c_i \in C, c_j \in C} \mathrm{sim}(c_i, c_j) \quad (1)$$

In equation (1), the first term tends to select queries that are more relevant to the particular document. The second term tends to select queries that can well represent the other queries, and $f(r_i)$ in the second term is used to weight the other queries according to their relevance to the particular document. The last term in equation (1) aims to select queries so that they are not similar, thereby providing some diversity in the representative queries when multiple representative queries are selected for each document. Further, the effect of the equation terms may be controlled or weighted based on empirical results and a desired outcome using the values $\alpha$ and $\beta$. For example, in some implementations, $\alpha = 1$ and $\beta = 0.3$ although other suitable values may be used in other implementations.

The set C of queries relevant to a particular document may be populated in a sequential manner, beginning with $C = \phi$. Then, queries may be identified and added to the set C as follows:

Step 1: For each query $q \in Q - C$, compute $F_q = F(C \cup \{q\}) - F(C)$.

Step 2: Find the query $q^*$ for which $F_q^*$ is maximal.

Step 3: If $F_q^* > 0$, add $q^*$ to C and repeat from step 1; otherwise, stop.

Click-Through-Guided Query Selection

The foregoing technique relies on dynamic rank of documents and frequency with which queries are issued by users for determining representative queries for the documents. Some implementations herein also may exploit click-through information obtained from search logs when determining representative queries for documents. For example, the click-through frequency of a document may reflect the degree to which a particular document is related to a particular query. In other words, if multiple users that submitted the same query clicked-on or frequently selected the particular document, this particular document is considered to be more closely related to the particular query than other documents returned in the search results for the particular query but not clicked on by the users. Thus, for each document, implementations herein record the click-through frequency as a vector t of dimension n. Combining this click-through information, implementations herein may determine the relevance $\bar{r}_j$ of a particular query to a particular document based on the following equation:

$$\bar{r}_j = \gamma r_i \delta[t_j > \theta] + (1-\gamma) r_i \quad (2)$$

Here, $\delta[t_j > \theta]$ is an indicator function whose value is 1 if frequency $t_j > \theta$, and 0 otherwise. The symbol $\gamma$ is a balance weight and may be set at 0.5 in some implementations. The symbol $\theta$ is a balance weight and may be set at 5 in some implementations.

Using the approach described above, implementations herein are able to determine a representative query or a set of representative queries for each document 106 of the plurality of documents 106, and store this information as the query-document correlations 110. When a set of search results 118 is returned by the search engine 114, as described above with respect to FIG. 1, the query insertion component 112 may access the query-document correlations 110 and obtain one or more representative queries 122 for each relevant document 120 in the search results 118. Thus, one or more representative queries 122 may be displayed proximate to the top k relevant documents 120 in the search results 118. A user may click on one of these representative queries 122 to obtain a new set of search results based on the representative query.

Search Results Categorization

In order to assist users in rapidly locating desired documents or other information, implementations herein may further provide supplemented search results by grouping or categorizing the search results based on the representative queries. For example, the approach described above provides a set of one or more representative queries 122 for each of the relevant documents 120 in the search results 118. Implementations herein may further combine together the sets of representative queries for the relevant documents 120 in the search results 118. This set of combined sets of representative queries may be referred to as the set $\mathcal{S}Q$. Subsequently, implementations herein may determine a representative queries set $\mathcal{R}Q$ from among the set of all representative queries $\mathcal{S}Q$ for the search results 118. An objective function for determining $\mathcal{R}Q$ may be expressed as follows:

$$F(\mathcal{R}Q) = \begin{cases} 0, & \exists c_i, c_j \in RQsti < j \wedge isSimilar(c_i, c_j) \\ \sum_i \max_{c \in \mathcal{R}Q} r(d_i, c), & \text{else} \end{cases} \quad (3)$$

Here, the function isSimilar($c_i$, $c_j$) returns true only when each of the terms in query $c_j$ either appear in query $c_i$ or is an ignored word. Further, $c_j$ may be a query that comes into $\mathcal{R}Q$ later than the term corresponding to $c_i$. This function strictly limits the similarity between queries in the representative queries set $\mathcal{R}Q$ so that the representative queries are able to provide diverse features. The second row in equation (3) tends to select queries that are more relevant to the relevant documents 120 in the search results 118. Based on the representative queries $\mathcal{R}Q$ selected using equation (3), each relevant document 120 in the search results 118 can be assigned into a group or category according to the representative query determined to be most relevant to that document 120 while some diversity among selected representative queries is maintained. As mentioned above, diversity among representative queries is desirable to enable a user to more quickly focus a search on a desired subject or intent.

Furthermore, using the representative query determined for each relevant document 120, implementations herein can present representative results as supplemental results information sorted by subject based on the corresponding representative query. For example, referring back to the example of FIG. 4, the query insertion component 112 may use the techniques described above to determine that the representative query 316 is most relevant to the second-ranked search result 310. The query insertion component may also determine the top documents (e.g., top 3 documents in FIG. 4) returned from the corresponding representative query 316 and may provide these as representative results 404 categorized as relating to the same subject matter as the second-ranked search result 310. Thus, the grouping or categorization is based on the representative query 316 having been determined to be most relevant to the documents in this category. Consequently, implementations herein are able to present supplemented search results that are grouped or categorized based on a representative query as being related subject matter of a particular search result returned for a currently submitted query. By selecting a representative query or a representative result, a user is able to quickly focus a search on a desired subject.

Search Results without Categorization

Figure 6:
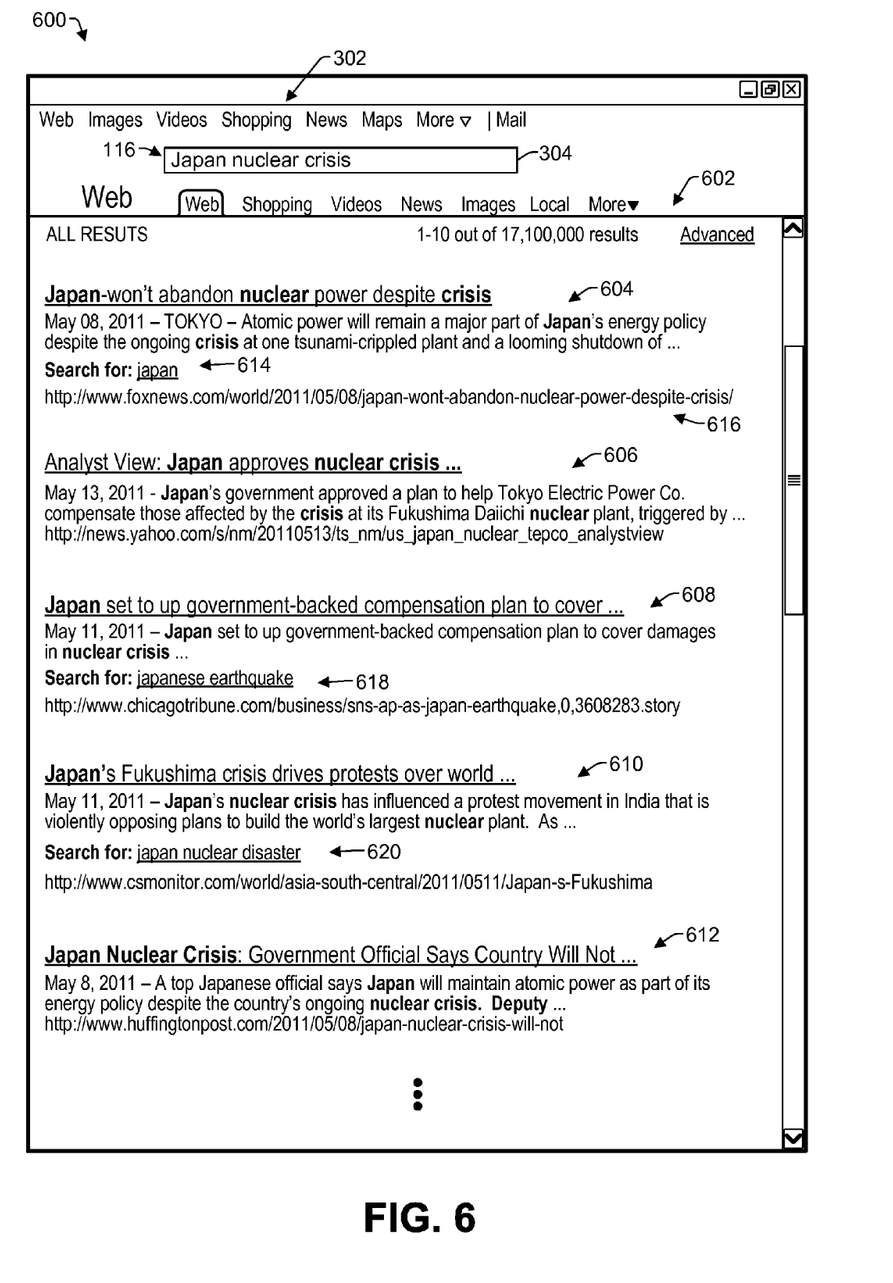
FIG. 6 illustrates an example search results page including representative queries according to some implementations.

FIG. 6 illustrates an example search results page 600 that depicts another possible results layout according to some implementations herein. For example, in some cases, the categorization techniques described herein may not be useful with all types of search result pages. For example, the performance of the categorization herein may be dependent on the characteristics of the issued query input. For instance, when a query input has a general meaning, such as "japan", which can be classified into several different branches, as shown in FIG. 3, the search results are able to be well presented using the categorization layout described above with respect to FIGS. 3 and 4. On the other hand, when the query input is substantially more specific, such as "japan nuclear crisis," and is not easily made even more specific, most documents in the search results do not contribute to a set of representative queries while still maintain diversity. In this situation, there is no need to classify the documents any further. Accordingly, as illustrated in FIG. 6, some implementations may instead present the documents in their original sequence, and provide some additional diverse representative queries corresponding to some of the documents in the search results.

In the example of FIG. 6, suppose that a user has entered "Japan nuclear crisis" as the query input 116 submitted to the search engine 114. The search engine 114 may locate a plurality of search results and provide the search results to the query insertion component 112, which may generate the search results page 600 with a listing 602 of the search results. The query insertion component 112 may construct the search results page 600 so that some of search results 604, 606, 608, 610, 612, . . . are presented with an associated representative query where such a representative query is determined to be relevant while also maintaining diversity of representative queries. In this example, a first representative query 614 "japan" is presented proximate to the first-ranked search result 604. For example, using the techniques described above, the query insertion component 112 may determine that the first representative query 614 "japan" is also representative of the first-ranked search result 604, "Japan won't abandon nuclear power despite crisis." Accordingly, the query insertion component 112 may insert the representative query 614 in a position proximate to the first-ranked search result 604, such as between the description of the first-ranked search result and the corresponding URL 616 for the first-ranked search result 604. In this example, the search results 608 and 610 also have representative queries 618 and 620, respectively, displayed in proximity thereto. On the other hand, the search results 606 and 612 do not include representative queries because the query insertion component 112 has determined that the query input 116 is substantially more relevant than any other candidate representative queries. Furthermore, in this example, representative results are not obtained or displayed with the search results; however, in other implementations, representative results may also be obtained and displayed (or a link thereto displayed) for each representative query 614, 618, 620. Other variations will also be apparent to those of skill in the art in view of the disclosure herein.

Example Architecture

Figure 7:
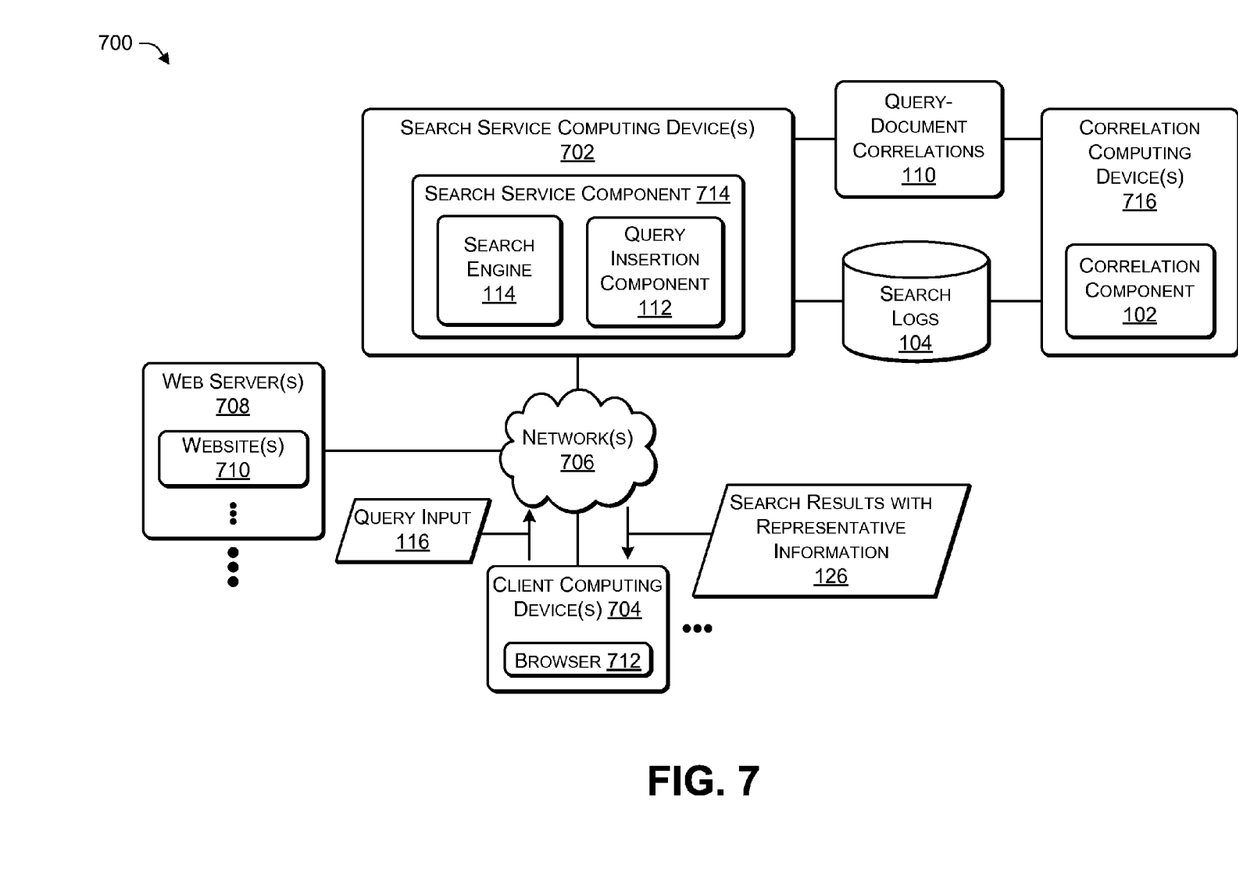
FIG. 7 illustrates an example architecture of a system for providing search results with representative information according to some implementations.

FIG. 7 illustrates an example architecture of a system 700 for providing representative information with search results according to some implementations herein. The illustrated example system of FIG. 7 is described in the context of an online search service. However, numerous other contexts, architectures and environments may implement the innovations described herein. In some implementations, the system 700 may be executed to perform functions according to the framework 100 described above. For example, the correlation component 108 and the query insertion component 112 may include computer-readable, processor-executable instructions and modules to specifically program one or more processors to form a particular machine for attaining the frameworks, processes and functions described herein.

System 700 includes one or more search service computing device(s) 702 able to communicate with one or more client computing device(s) 704 through one or more network(s) 706. In some implementations, search service computing device 702 exists as a part of a data center, a server farm, or the like, and is able to serve as a component for providing an online search service website. The system 700 can include any number of the search service computing devices 702 in communication with any number of client computing devices 704. For example, in one implementation, network 706 includes the World Wide Web implemented on the Internet, including numerous databases, servers, personal computers (PCs), workstations, terminals, mobile devices and other computing devices spread throughout the world and able to communicate with one another. Accordingly, search service computing device 702 and client computing device 704 may be able to communicate with a plurality of web servers 708 that host a plurality of websites 710. Alternatively, in another possible implementation, the network 706 can include just a single search service computing device 702 in communication with one or more client devices 704 via a LAN (local area network) or a WAN (wide area network). Thus, the client computing devices 704 can be coupled to the search service computing device 702 in various combinations through wired and/or wireless network(s) 706, including a LAN, WAN, or any other networking technology, using one or more protocols, for example, a transmission control protocol running over Internet protocol (TCP/IP), or other suitable protocols.

In some implementations, client computing devices 704 are personal computers, workstations, terminals, mobile computing devices, PDAs (personal digital assistants), cell phones, smartphones, laptops, tablet computing devices, or other computing devices having data processing capability. Furthermore, client computing devices 704 may include a browser 712 or other application for communicating with search service computing device 702, such as for submitting a search query input 116 to the search service computing device 702, and for receiving and displaying the search results with representative information 126. Browser 712 may be any suitable type of web browser such as Internet Explorer®, Firefox®, Chrome®, Safari®, or other type of software or application configured to enable submission of a query input and receipt of search results.

In addition, search service computing device 702 may include a search service component 714 for providing search services to the client computing devices 704. Search service component may include the search engine 114 for receiving query inputs 116 from the client computing devices 704 and the query insertion component 112 for incorporating representative information into the search results located by the search engine 114. In some implementations, search service component 714 and search engine 114 may include numerous other components and modules, such as a user interface, a web crawler, an indexing component, and the like (not shown). Accordingly, the search engine 114 may provide a user interface such as a webpage able to be viewed and interacted with by the client computing devices through browsers 712 for submitting the query input 116. Other variations will also be apparent in view of the disclosure herein.

Additionally, one or more correlation computing device(s) 716 having correlation component 102 may be provided for carrying out the query-document correlation disclosed herein. In some implementations, the correlation computing device 716 may be the same computing device as search service computing device 702; however, in other implementations, correlation computing device 716 may be part of an offline search service facility that accesses the search logs 104 to determine query-document correlations 110 from the search logs 104. In some implementations, the query-document correlations 110 may include an index that enables the query insertion component 112 to quickly locate a representative query for a particular search result provided by the search engine 114.

Furthermore, while FIG. 7 sets forth one example of a suitable architecture for a system 700 for providing search results with supplemental representative information, numerous other possible architectures, frameworks, systems and environments will be apparent to those of skill in the art in view of the disclosure herein. Additionally, while the examples herein have been described in the environment of an online search service, other implementations may be directed to other types of computer search and information retrieval applications. Thus, the implementations herein may be extended to other types of searches.

Example Process

Figure 8:
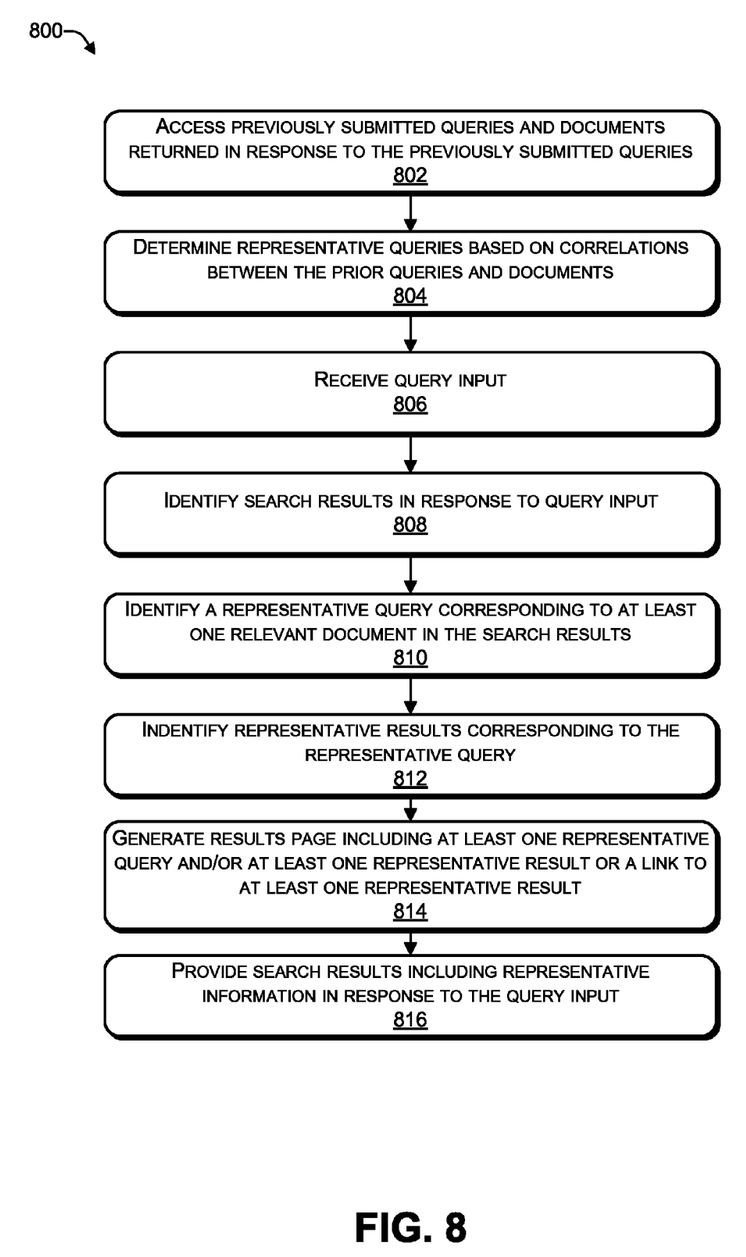
FIG. 8 is a flow diagram of an example process for providing search results with representative information according to some implementations.

FIG. 8 is a flow diagram of an example process 800 for providing search results including representative information in response to a query input according to some implementations. In the flow diagram of FIG. 8, each block represents one or more operations that can be implemented in hardware, software, or a combination thereof. In the context of software, the blocks represent computer-executable instructions that, when executed by one or more processors, cause the processors to perform the recited operations. Generally, computer-executable instructions include routines, programs, objects, modules, components, data structures, and the like that perform particular functions or implement particular abstract data types. The order in which the blocks are described is not intended to be construed as a limitation, and any number of the described operations can be combined in any order and/or in parallel to implement the processes. For discussion purposes, the process 800 is described with reference to the framework 100 discussed above, although other frameworks, systems and environments may implement this process.

At block 802, the correlation component 102 accesses a plurality of previously submitted queries and corresponding documents returned in response to the previously submitted queries. For example, the previously submitted queries and corresponding documents may be obtained from a search log or the like.

At block 804 the correlation component 102 determines representative queries for the documents based on correlations between the previously submitted queries and the corresponding documents. In some implementations, the correlation component may construct a bipartite graph from the queries and the documents and may apply weighting factors to the edges of the graph based on a dynamic ranking of each document relative to the corresponding queries. The correlation component may also take into account the frequency with which a query is issued by users and a dynamic rank of each document. Furthermore, in some implementations, when multiple representative queries are selected, the correlation component may also consider a similarity between representative queries so as to introduce some diversity among the representative queries selected for each document. Additionally, in some implementations, the correlation component may also take into account the click-through frequency for a particular document in relation to a particular query.

At block 806, the search engine 114 receives a query input. For example, a user accessing the search engine may submit a query input to the search engine to attempt to locate desired information.

At block 808, the search engine may identify search results in response to the query input. For example, the search results may include a plurality of relevant documents determined by the search engine to be highly ranked in response to the query input.

At block 810, the query insertion component 112 may determine one or more representative queries corresponding to the relevant documents in the search results. For example, the query insertion component 112 may access query-document correlations determined by the correlation component 102 to determine one or more representative queries corresponding to the relevant documents in the search results.

At block 812, the query insertion component 112 may identify representative results corresponding to a representative query identified in block 810. For example, if a representative query is identified for each of the relevant documents in the search results, the query insertion component 112 may determine the representative results corresponding to each of the representative queries. In some implementations, the representative results may be the top several ranked documents returned by the search engine in response to submission of the representative query.

At block 814, the query insertion component 112 may generate a results page including at least one representative query and/or at least one representative result or a link to at least one representative result. For example, in some implementations, a representative query and a link to corresponding representative results may be provided proximate to each relevant document in the results page.

At block 816, the search results including the representative information such as the representative queries and/or the representative results or a link to the representative results are provided in response to the query input. For example, the query insertion component 112 or the search engine 114 may provide the generated results page to a user that submitted the query input. Furthermore, while an example of a process according to some implementations has been described above, numerous variations will be apparent to those of skill in the art in view of the disclosure herein.

Example Computing Device and Environment

Figure 9:
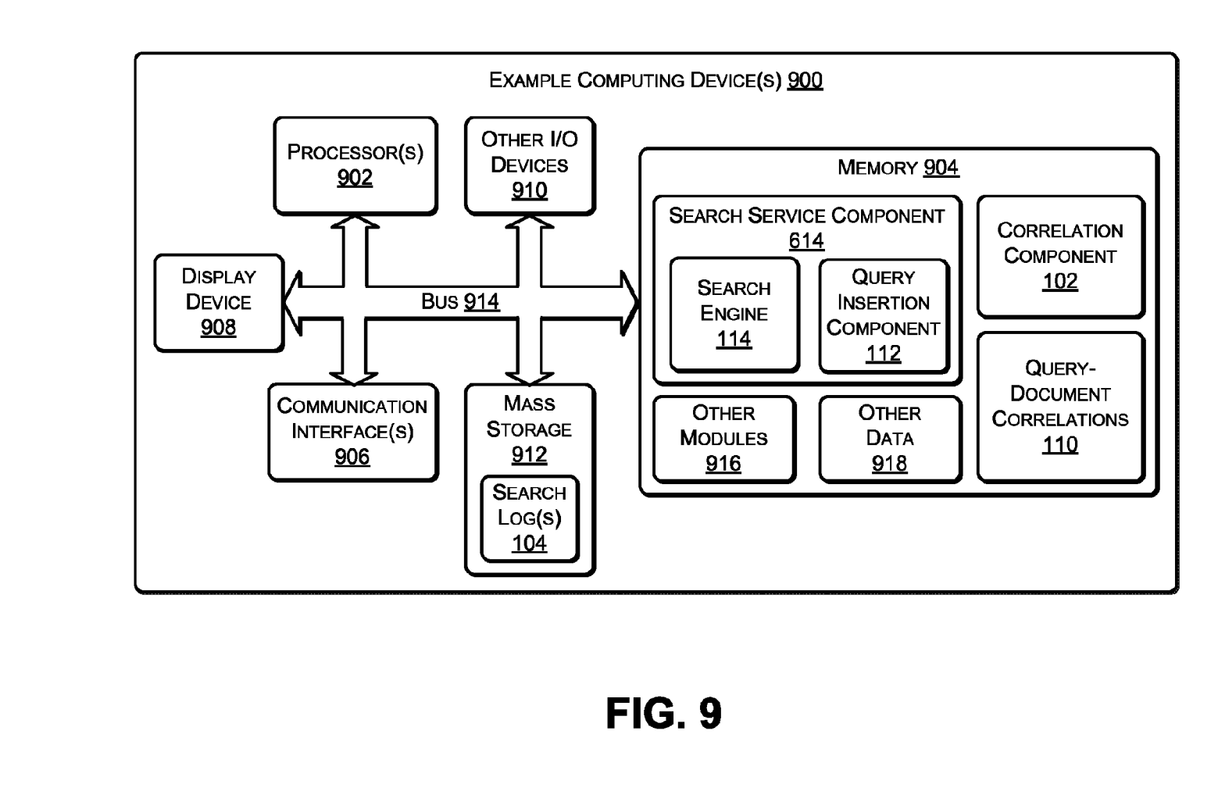
FIG. 9 is a block diagram of an example computing device and environment according to some implementations.

FIG. 9 illustrates an example configuration of a computing device 900 and environment that can be used to implement the components, modules and functions described herein. For example, the computing device(s) 900 may correspond to one or more of search service computing device(s) 702 and/or correlation computing device(s) 716. The computing device 900 may include at least one processor 902, a memory 904, communication interfaces 906, a display device 908, other input/output (I/O) devices 910, and one or more mass storage devices 912, able to communicate with each other, such as through a system bus 914 or other suitable connection.

The processor 902 may be a single processing unit or a number of processing units, all of which may include single or multiple computing units or multiple cores. The processor 902 can be implemented as one or more microprocessors, microcomputers, microcontrollers, digital signal processors, central processing units, state machines, logic circuitries, and/or any devices that manipulate signals based on operational instructions. Among other capabilities, the processor 902 can be configured to fetch and execute computer-readable instructions stored in the memory 904, mass storage devices 912, or other computer-readable media.

Memory 904 and mass storage devices 912 are examples of computer storage media for storing instructions which are executed by the processor 902 to perform the various functions described herein. For example, memory 904 may generally include both volatile memory and non-volatile memory (e.g., RAM, ROM, or the like). Further, mass storage devices 912 may generally include hard disk drives, solid-state drives, removable media, including external and removable drives, memory cards, flash memory, floppy disks, optical disks (e.g., CD, DVD), a storage array, a network attached storage, a storage area network, or the like. Both memory 904 and mass storage devices 912 may be collectively referred to as memory or computer storage media herein, and may be a non-transitory media capable of storing computer-readable, processor-executable program instructions as computer program code that can be executed by the processor 902 as a particular machine configured for carrying out the operations and functions described in the implementations herein.

The computing device 900 may also include one or more communication interfaces 906 for exchanging data with other devices, such as via a network, direct connection, or the like, as discussed above. The communication interfaces 906 can facilitate communications within a wide variety of networks and protocol types, including wired networks (e.g., LAN, cable, etc.) and wireless networks (e.g., WLAN, cellular, satellite, etc.), the Internet and the like. Communication interfaces 906 can also provide communication with external storage, such as in a storage array, network attached storage, storage area network, or the like, which may be included as mass storage 912. For example, mass storage 912 may contain the search log(s) 104 described above.

A display device 908, such as a monitor may be included in some implementations for displaying information and images to users. Other I/O devices 910 may be devices that receive various inputs from a user and provide various outputs to the user, and may include a keyboard, a remote controller, a mouse, a printer, audio input/output devices, and so forth.

Memory 904 may include modules and components for providing search results with supplemental or representative information according to the implementations herein. In the illustrated example, memory 904 includes the search service component 714 described above that affords functionality for receiving query inputs and providing search results in response. For example, as discussed above, search service component 714 may include the query insertion component 112 and the search engine 114 described above. In the illustrated example, memory 904 also includes the correlation component 102 for determining the query-document correlations 110. As mentioned above, the query-document correlation may be carried out by the same computing device(s) that provide the search results, or by separate computing device (s). Memory 904 may further include one or more other modules 916, such as an operating system, drivers, communication software, or the like. Memory 904 may also include other data 918, such as data stored while performing the functions described above and data used by the other modules 916.

The example systems and computing devices described herein are merely examples suitable for some implementations and are not intended to suggest any limitation as to the scope of use or functionality of the environments, architectures and frameworks that can implement the processes, components and features described herein. Thus, implementations herein are operational with numerous environments or architectures, and may be implemented in general purpose and special-purpose computing systems, or other devices having processing capability. Generally, any of the functions described with reference to the figures can be implemented using software, hardware (e.g., fixed logic circuitry) or a combination of these implementations. The term "module," "mechanism" or "component" as used herein generally represents software, hardware, or a combination of software and hardware that can be configured to implement prescribed functions. For instance, in the case of a software implementation, the term "module," "mechanism" or "component" can represent program code (and/or declarative-type instructions) that performs specified tasks or operations when executed on a processing device or devices (e.g., CPUs or processors). The program code can be stored in one or more computer-readable memory devices or other computer storage devices. Thus, the processes, components and modules described herein may be implemented by a computer program product.

Although illustrated in FIG. 9 as being stored in memory 904 of computing device 900, correlation component 102, query insertion component 112, or portions thereof, may be implemented using any form of computer-readable media that is accessible by computing device 900. As used herein, "computer-readable media" includes, at least, two types of computer-readable media, namely computer storage media and communications media.

Computer storage media includes volatile and non-volatile, removable and non-removable media implemented in any method or technology for storage of information, such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device.

In contrast, communication media may embody computer readable instructions, data structures, program modules, or other data in a modulated data signal, such as a carrier wave, or other transmission mechanism. As defined herein, computer storage media does not include communication media.

Additionally, this disclosure provides various example implementations, as described and as illustrated in the drawings. However, this disclosure is not limited to the implementations described and illustrated herein, but can extend to other implementations, as would be known or as would become known to those skilled in the art. Further, reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

CONCLUSION

Although the subject matter has been described in language specific to structural features and/or methodological acts, the subject matter defined in the appended claims is not limited to the specific features or acts described above. Rather, the specific features and acts described above are disclosed as example forms of implementing the claims. This disclosure is intended to cover any and all adaptations or variations of the disclosed implementations, and the following claims should not be construed to be limited to the specific implementations disclosed in the specification. Instead, the scope of this document is to be determined entirely by the following claims, along with the full range of equivalents to which such claims are entitled.

The invention claimed is:

1. A method comprising:
    under control of one or more processors specifically configured with executable instructions,
    determining, based on correlations between a plurality of queries and a plurality of documents in a search log, at least one representative query for each document of the plurality of documents, the at least one representative query determined to be likely to return a corresponding document as a highly-ranked result;
    receiving a query input;
    identifying a plurality of relevant documents as search results in response to the query input;
    identifying a representative query corresponding to at least one of the relevant documents, wherein the representative query is different from the query input;
    executing the representative query to identify representative results corresponding to the representative query; and
    providing the search results in response to the query input, the search results including the representative query and at least one of: the representative results identified in response to executing the representative query or a link to view the representative results identified in response to executing the representative query.

2. The method as recited in claim 1, the determining at least one representative query for each document of the plurality of documents further comprising:
    constructing a bipartite graph representing the plurality of queries and the plurality of documents in the search log; and
    assigning weights to edges between the query and the documents, the weights indicating a dynamic rank value of a particular document appearing in a result of a particular query.

3. The method as recited in claim 2, the determining at least one representative query for each document of the plurality of documents further comprising associating with each query of the plurality of queries a value reflecting a frequency with which the query is issued.

4. The method as recited in claim 1, the determining at least one representative query for each document of the plurality of documents further comprising determining a plurality of representative queries for each document by taking into consideration both relevance of the representative queries to a corresponding document and similarity of the representative queries to other representative queries selected for the corresponding document.

5. The method as recited in claim 1, further comprising:
    identifying a representative query corresponding to each of the relevant documents;
    identifying representative results corresponding to each of the representative queries; and
    providing the search results in response to the query input, the search results including the representative query and a link to view the representative results for each of the plurality of relevant documents in the search results.

6. The method as recited in claim 5, further comprising generating a results page including the search results, the representative query and the links to view the representative results so that, when the result page is rendered, the representative query and the link to the representative results associated with each individual relevant document appear proximate to that individual relevant document.

7. The method as recited in claim 5, further comprising:
    determining a plurality of representative queries for each of the plurality of relevant documents identified in the search results; and
    selecting a representative query for the each of the plurality of relevant documents from the multiple representative queries for each of the plurality of relevant documents by taking into consideration both relevance of the representative queries to a corresponding relevant document and similarity of the representative queries to other representative queries selected for other relevant documents of the plurality of relevant documents.

8. Computer-readable storage media maintaining instructions executable by one or more processors to perform operations comprising:
    correlating a plurality of queries with a plurality of documents to identify at least one representative query for each document, the at least one representative query for a document being at least one query determined to be likely to be submitted by a user that selects the document;
    receiving a query input; and
    providing search results in response to the query input, the search results including a particular representative query determined during the correlating to be related to a particular document when the particular document is identified in the search results and at least a portion of representative results determined in response to execution of the particular representative query, wherein the particular representative query is different from the query input.

9. The computer-readable storage media as recited in claim 8, the operations further comprising:
    identifying, as representative results, one or more top-ranked documents returned in response to the representative query; and
    including a link to the representative results with the search results provided in response to the query input.

10. The computer-readable storage media as recited in claim 9, wherein the link is expandable to display the representative results proximate to the identification of the particular document in the search results.

11. The computer-readable storage media as recited in claim 8, the operations further comprising:
    identifying, as representative results, one or more top-ranked documents returned in response to the representative query; and
    including a link to the representative results with the search results provided in response to the query input.

12. The computer-readable storage media as recited in claim 8, the correlating further comprising:
    accessing click-through information indicating which documents users selected in results received in response to a particular query of the plurality of queries; and
    identifying the representative query for each document based, at least in part, on the click-through information.

13. The computer-readable storage media as recited in claim 8, the providing the search results in response to the query input further comprising:
    determining a plurality of representative queries for each of a plurality of documents identified in the search results; and
    selecting a representative query for the each of the plurality of documents from the multiple representative queries for each of the plurality of documents by taking into consideration both relevance of the representative queries to a corresponding document and similarity of the representative queries to other representative queries selected for other documents of the plurality of documents.

14. A system comprising:
    one or more processors;
    one or more computer-readable media;
    a search engine maintained on the computer-readable media and executed on the one or more processors to receive a query and obtain a plurality of search results corresponding to the query; and
    a query insertion component maintained on the computer-readable media and executed on the one or more processors to:
        obtain a representative query corresponding to a particular search result of the plurality of search results, wherein the representative query is different from the received query;
        communicate the representative query to the search engine to be executed by the search engine to obtain a representative result corresponding to the representative query; and
        generate a result page in response to the query, the result page including the particular search result, the representative query and at least one of:
            the representative result obtained in response to the search engine executing the representative query; or
            a link to the representative result obtained in response to the search engine executing the representative query.

15. The system as recited in claim 14, wherein the query insertion component is executed to:
    obtain a plurality of the representative queries corresponding to the plurality of search results;
    communicate each of the plurality of representative queries to the search engine to be executed by the search engine to obtain at least one representative result for each of the plurality of representative queries; and
    generate the result page to include the plurality of search results, the plurality of representative queries and a plurality of links to the representative results for the plurality of representative queries obtained in response to the search engine executing each of the plurality of representative queries.

16. The system as recited in claim 15, wherein the query insertion component generates the result page so that, when the result page is rendered, the representative query and the link to the representative results associated with each individual search result appear proximate to that individual search result.

17. The system as recited in claim 15, wherein the query insertion component generates the result page so that, when the result page is rendered, the link to the representative results is expandable to display the representative results associated with an individual search result proximate to that individual search result.

18. The system as recited in claim 14, further comprising:
    a correlation component maintained on the computer-readable media and executed on the one or more processors to relate a plurality of documents to a plurality of representative queries based, at least in part, on rankings of the documents and a relative popularity of the queries for determining a representative query corresponding to each of the plurality of documents.

19. The system as recited in claim 18, wherein the representative query is further determined based, at least in part, on click-through information obtained from a search log indicating documents that are likely to be clicked on as a result of particular queries.

20. The system as recited in claim 14, wherein the query insertion component is executed to obtain the representative query by using a uniform resource locator (URL) of the particular search result to determine the representative query corresponding to that URL.

* * * * *